United States Patent
Brown et al.

(10) Patent No.: US 6,208,965 B1
(45) Date of Patent: *Mar. 27, 2001

(54) METHOD AND APPARATUS FOR PERFORMING A NAME ACQUISITION BASED ON SPEECH RECOGNITION

(75) Inventors: Deborah W. Brown, Manalapan; Randy G. Goldberg, Princeton; Richard R. Rosinski, Middletown, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/975,587

(22) Filed: Nov. 20, 1997

(51) Int. Cl.[7] ................................................ G10L 15/06
(52) U.S. Cl. .................... 704/246; 704/251; 704/270; 455/563
(58) Field of Search .................................... 704/240, 241, 704/243, 244, 245, 246, 251, 256, 270, 272, 273, 275; 379/88; 455/563

(56) References Cited

U.S. PATENT DOCUMENTS

| | | | |
|---|---|---|---|
| 4,783,804 | 11/1988 | Juang et al. | 704/245 |
| 4,817,156 | 3/1989 | Bahl et al. | 704/256 |
| 4,819,271 | 4/1989 | Bahl et al. | 704/256 |
| 5,050,215 | 9/1991 | Nishimura | 704/244 |
| 5,125,022 | 6/1992 | Hunt et al. | 379/88 |
| 5,127,043 | 6/1992 | Hunt et al. | 379/88 |
| 5,216,720 | * 6/1993 | Naik et al. | 704/272 |
| 5,255,310 | * 10/1993 | Kim et al. | 379/88 |
| 5,297,194 | 3/1994 | Hunt et al. | 379/88 |
| 5,303,299 | 4/1994 | Hunt et al. | 379/88 |
| 5,365,574 | 11/1994 | Hunt et al. | 379/88 |
| 5,384,833 | 1/1995 | Cameron | 704/275 |
| 5,418,717 | 5/1995 | Su et al. | 364/419.08 |
| 5,452,397 | 9/1995 | Ittycheriah et al. | 395/2.49 |
| 5,455,889 | 10/1995 | Bahl et al. | 704/236 |
| 5,499,288 | 3/1996 | Hunt et al. | 379/88 |
| 5,502,774 | 3/1996 | Bellegarda | 382/159 |
| 5,504,805 | 4/1996 | Lee | 379/67 |
| 5,509,104 | 4/1996 | Lee et al. | 395/2.65 |
| 5,517,558 | 5/1996 | Schalk | 379/88 |
| 5,519,786 | * 5/1996 | Courtney et al. | 382/159 |
| 5,526,465 | 6/1996 | Carey et al. | 704/250 |
| 5,566,272 | 10/1996 | Brems et al. | 704/231 |
| 5,613,109 | 3/1997 | Yamauchi et al. | 395/615 |
| 5,623,578 | 4/1997 | Mikkilineni | 704/255 |
| 5,655,058 | 8/1997 | Balasubramanian et al. | 704/236 |
| 5,675,704 | 10/1997 | Juang et al. | 704/246 |
| 5,677,990 | 10/1997 | Junqua | 704/252 |
| 5,680,509 | * 10/1997 | Gopalakrishnan et al. | 704/270 |
| 5,680,511 | 10/1997 | Baker et al. | 395/2.66 |
| 5,687,287 | 11/1997 | Gandhi et al. | 704/247 |
| 5,729,656 | 3/1998 | Nahamoo et al. | 704/254 |
| 5,748,840 | 5/1998 | La Rue | 704/253 |
| 5,781,882 | 7/1998 | Davis et al. | 704/221 |

(List continued on next page.)

Primary Examiner—David R. Hudspeth
Assistant Examiner—Susan Wieland
(74) Attorney, Agent, or Firm—Kenyon & Kenyon

(57) ABSTRACT

A method and apparatus for recognizing an input identifier on the basis of a set of comparison identifiers. After a user provides the input identifier according to a first form, the present invention provides a recognized identifier based on the input identifier. The present invention then generates a plurality of comparison identifiers on the basis of the recognized identifier. The user is then prompted to provide the input identifier again, but this time according to a second form that is different than the first form. A second recognized identifier is then generated on the basis of the input identifier provided according to the second form. If a match exists between the second recognized identifier and one of the comparison identifiers, the matched comparison identifier is selected as corresponding to the input identifier.

23 Claims, 6 Drawing Sheets

U.S. PATENT DOCUMENTS

| | | | |
|---|---|---|---|
| 5,794,042 | 8/1998 | Terada et al. | 395/701 |
| 5,799,269 | 8/1998 | Schabes et al. | 704/9 |
| 5,802,205 | 9/1998 | Emico et al. | 382/187 |
| 5,818,952 | 10/1998 | Takenouchi et al. | 382/101 |
| 5,829,000 | 10/1998 | Huang et al. | 704/252 |
| 5,841,901 | 11/1998 | Arai et al. | 382/187 |
| 5,850,480 | 12/1998 | Scanlon | 382/229 |
| 5,870,492 | 2/1999 | Shimizu et al. | 382/187 |
| 5,889,897 | 3/1999 | Medina | 382/309 |
| 5,903,864 | 5/1999 | Gadbois et al. | 704/251 |
| 6,061,654 * | 5/2000 | Brown et al. | 704/275 |

* cited by examiner

METHOD AND APPARATUS FOR PERFORMING A NAME ACQUISITION BASED ON SPEECH RECOGNITION

CROSS-REFERENCE TO RELATED APPLICATIONS

The present application is related to the following commonly assigned U.S. patent applications: Ser. No. 08/763,382, filed Dec. 13, 1996, entitled "Statistical Database Correction Of Alphanumeric Account Numbers For Speech Recognition And Touch-Tone Recognition;" Ser. No. 08/771,356, filed Dec. 16, 1996, entitled "Constrained Alpha-Numerics For Accurate Account Number Recognition;" Ser. No. 08/909,199, filed Aug. 11, 1997, entitled "A Confusion Matrix Based Method And System For Correcting Misrecognized Words Appearing In Documents Generated By An Optical Character Recognition Technique;" Ser. No. 08/909,200, filed Aug. 11, 1997, entitled "Method And Apparatus For Performing An Automatic Correction Of Misrecognized Words Produced By An Optical Character Recognition Technique By Using A Hidden Markov Model Based Algorithm;" Ser. No. 08/953,579, filed Oct. 17, 1997, entitled "Method And Apparatus For Accessing Pre-Defined Grammars;" Ser. No. 08/953,469, filed Oct. 17, 1997, entitled "Method And Apparatus For Minimizing Grammar Complexity;" Ser. No. 08/953,468, filed Oct. 17, 1997, entitled "Method And Apparatus For Performing A Grammar-Pruning Operation;" and Ser. No. 08/975,588, entitled "Confusion Set-Based Method And Apparatus For Pruning A Predetermined Arrangement Of Indexed Identifiers," and Ser. No. 08/975,589, entitled "Check-Sum Based Method And Apparatus For Performing Speech Recognition," filed concurrently herewith.

BACKGROUND INFORMATION

The present invention is directed to a method and apparatus for recognizing an input identifier, and, in particular, to a method and apparatus that recognizes the input identifier on the basis of a set of comparison identifiers that is generated from the input identifier provided by the user.

Most institutions, such as banks, department stores, and airlines, allow customers to access over the telephone a wide variety of services and information. Before the advent of touch-tone telephones, a customer would obtain these services and information through interacting with a live operator. As touch-tone telephones became more prevalent in homes, these institutions began switching to automated customer-access systems. After dialing a telephone number, a customer using such systems would be asked to enter an account number, or some other identifier. The user would enter the account number through the keys of a touch-tone keypad. As used herein, the term "identifier" refers to a string of characters that may comprise a plurality of letters, numbers, or both; based on this definition, an identifier may comprise either a random aggregation of characters, an actual word, or the name of a place or a person. Furthermore, as used herein, an identifier may comprise, but is not limited to, a string of characters for identifying a particular product, service, location, or account information.

Today, a user can provide such an identifier to an institution through a number of ways besides touch-tone telephony, including by speaking the identifier into the telephone handset. When the user is prompted to speak the identifier, the institution uses a speech recognition system to produce a recognized identifier based on the spoken identifier. Regardless of how the user enters the identifier, however, once a recognized signal representative of the input identifier has been received at the institution, the institution must match the recognized signal with one of a plurality of pre-stored identifiers, which are also referred to as reference identifiers. After a match between the input identifier and a reference identifier is found, the institution performs a transaction based on the matched reference identifier, such as retrieving account information or ordering a specific product. Finding such a match may take some time, however, since institutions often maintain thousands, if not millions, of reference identifiers. Moreover, the more reference identifiers that an institution must search through in order to find a match with an input identifier, the less accurate this search becomes, especially when the reference identifiers are alphanumeric, which tend to be confused with one another. Matching input identifiers with the wrong reference identifiers at least leads to delays and customer dissatisfaction, and perhaps also to erroneous billing or even to divulging sensitive, confidential information. What is therefore needed is a system that maintains a high degree of accuracy in finding a match for an input identifier by carrying out a procedure that eliminates the need to rely on a pre-stored set of reference identifiers.

SUMMARY OF THE INVENTION

The present invention is directed to a method and apparatus that recognizes an input identifier by matching it with one of a plurality of comparison identifiers generated on the basis of the input identifier itself. Thus, the present invention does not use a pre-stored set of reference identifiers to find a match for the input identifier. The present invention first requires a user to provide the input identifier according to a first form. For example, the present invention may require the user to spell a name that is to serve as the input identifier. The present invention provides a first recognized identifier based on the input identifier. On the basis of this recognized identifier, the present invention generates a plurality of comparison identifiers. The present invention then prompts the user to provide the input identifier again, but this time in a different form than the first. For example, the present invention may require the user to pronounce the name that he previously spelled. The present invention then generates a second recognized identifier on the basis of the second entry of the input identifier.

In order to generate the set of comparison identifiers, the present invention uses a confusion matrix, which is a data structure from which the present invention can determine the probability that a particular character of the input identifier provided by the user will be recognized as another character. From this confusion matrix, the present invention determines for each character of the first recognized identifier an alternative character set. The characters of each alternative character set is associated with at least a certain probability of having been spoken as an input letter for the character occupying the associated character position. Thus, if the first character of a recognized identifier is "A", and it is associated with the alternative character set "A", "J", and "K", what this means is that there was at least a certain probability that the user spoke either "J" or "K," but the present invention recognized this pronunciation as an "A".

As an alternative way to generate the set of comparison identifiers, the present invention employs a collection of pre-stored confusion sets. The characters of each confusion set have a relatively high probability of being confused with the other characters in the same set. Characters from different confusion sets have a relatively low probability of being confused with one another. When using confusion sets, the present invention determines for the first recognized identifier which confusion set includes which characters of the first recognized identifier. Based on these determined confusion sets, the present invention generates the set of comparison identifiers.

In order to take into account the possibility that the character length of the generated comparison identifiers is not equal to the character length of the input identifier, the set of comparison identifiers is expanded by the addition of further comparison identifiers that are of a variable character length. Each of these variable-length comparison identifiers are determined in accordance with pre-stored rules that allow for certain character additions, substitutions, or deletions. In order to compare the second identifiers only with valid comparison identifiers, the present invention eliminates from the set of comparison identifiers those comparison identifiers that comprise mere aggregation of characters of no intelligible arrangement. For example, if the identifiers correspond to actual words, the present invention employs a set of pre-stored spelling rules to root out those identifiers that do not have accepted English-language spellings. Thus, the present invention may be programmed to eliminate those comparison identifiers that do not follow the letter "Q" with the letter "U".

After the set of comparison identifiers has been generated according to the above-discussed techniques, the present invention determines whether the second recognized identifier matches any of the comparison identifiers. If a match is found, then the matched comparison identifier is selected as corresponding to the input identifier. It should be appreciated that the techniques involving confusion matrices and confusion sets are but two ways by which a plurality of comparison identifiers may be generated based on an input identifier, and that the present invention encompasses other techniques for generating comparison identifiers from an input identifier.

DETAILED DESCRIPTION

Figure 1:
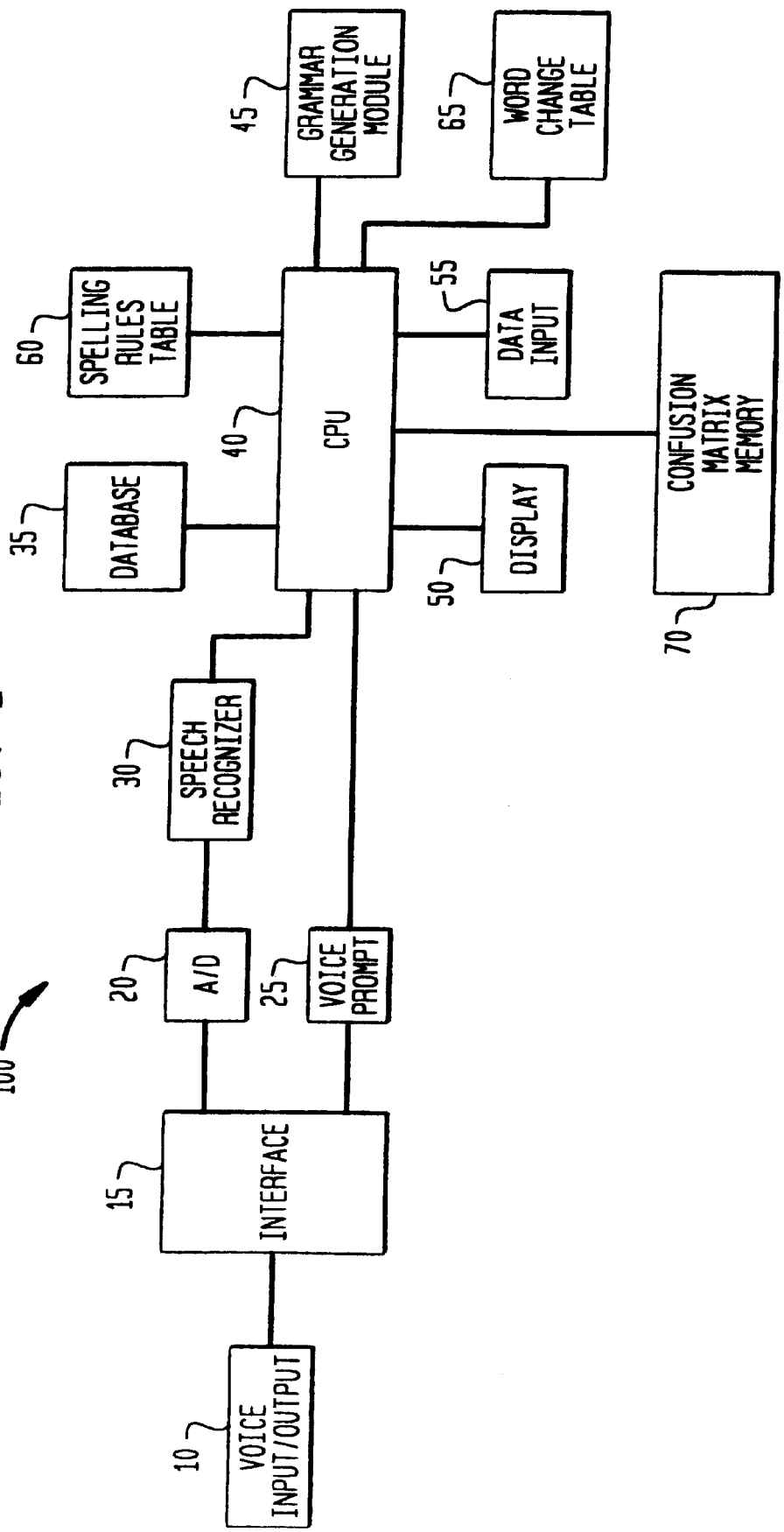
FIG. 1 illustrates a block diagram of an apparatus in accordance with a first embodiment of the present invention.

FIG. 1 illustrates a first embodiment of a system 100 that implements the name acquisition method of the present invention. The system of FIG. 1 is merely an example of one kind of system that is capable of supporting the present name acquisition routine, and it should be appreciated that the present name acquisition routine is compatible with numerous other applications.

The system 100 of FIG. 1 includes a voice input/output device 10, which may comprise a conventional telephone, or any other known device capable of converting an audible vocal signal to an electrical signal and vice versa. Connected to the voice input/output device 10 is an interface 15 that interfaces the voice input/output device 10 to the remaining components of system 100. The interface 15 may comprise a conventional public switched telephone network ("PSTN"). Of course, an interface is necessary only if the voice is to be transmitted to a remote location for processing; as an alternative, the components of system 100 may be provided in a unitary apparatus, save for the interface 15. The present invention is intended to encompass both types of systems. After the voice signal is converted to a digital signal by an analog-to-digital ("A/D") converter 20, the digitized voice signal is provided to a speech recognizer 30, which may comprise a HARK™ 3.0 recognizer, for example. This input voice signal may also be referred to as an "input identifier." Although the system of the present invention is flexible enough to process identifiers that are in the form of any combination of letters, numbers, or typographical characters, for purposes of illustration only, this discussion shall focus on the manner in which system 100 processes names. After employing a suitable speech recognition routine, which may, for example, be based on the Hidden Markov Model, speech recognizer 30 provides a recognized output that is intended to correspond to the input identifier spoken by the user into the voice input/output device 10. This recognized output, which is in the form of a well-known digital code, is referred to as a recognized "identifier," and it is provided to an input of CPU 40. Coupled to CPU 40 are a database 35, a grammar generation module 45, a spelling rules table 60, a word change table 65, and a confusion matrix memory 70. Also coupled to CPU 40 are data input device 50 and display 55. Data input device 50 may comprise a keyboard, a floppy disk drive, a CD-ROM drive, or any other component that is suitable for delivering external data to system 100. The system 100 also includes a voice prompt device 25, which provides, under the control of CPU 40, audible voice prompts that are intended to guide a user through the operation of system 100.

As stated above, the recognizer 30 accepts a digitized voice signal based on the spoken identifier and produces a recognized identifier that is intended to match the spoken identifier. In previously proposed name recognition systems, the recognized identifier would be compared to a database of reference identifiers corresponding to names that are deemed valid by system 100. Since the number of names in such a database tends to be extremely large, attempts to match the recognized identifier to one of these reference identifiers may be time-consuming and prone to error. The present invention not only reduces the time needed to find a match for the recognized identifier, it also enhances the likelihood that an identifier selected as a match for the recognized identifier does in fact correspond to what the user initially spoke. The present invention accomplishes these goals by eliminating the need to search through the same static, unchanging list of reference identifiers in order to find an appropriate match for the input identifier. Instead of relying on a pre-stored collection of reference identifiers, the present invention relies on grammar generation module 45 to generate for each input identifier a new set of identifiers and to select from this generated set of identifiers a match for the recognized identifier. This self-generated group of identifiers is referred to as a generated grammar, and, as shall be explained hereafter, the contents of the generated grammar depends on the recognized identifier. Thus, through the operation of the grammar generating module 65, the amount of identifiers to which the recognized identifier is compared is reduced to a more manageable amount, one which improves the recognition accuracy of the system 100 and reduces processing time.

Although the principles of the present invention are discussed herein within the context of a speech recognition system, it should be appreciated that the present invention may also rely on touch-tone telephone signaling to produce the recognized identifier.

Figure 2:
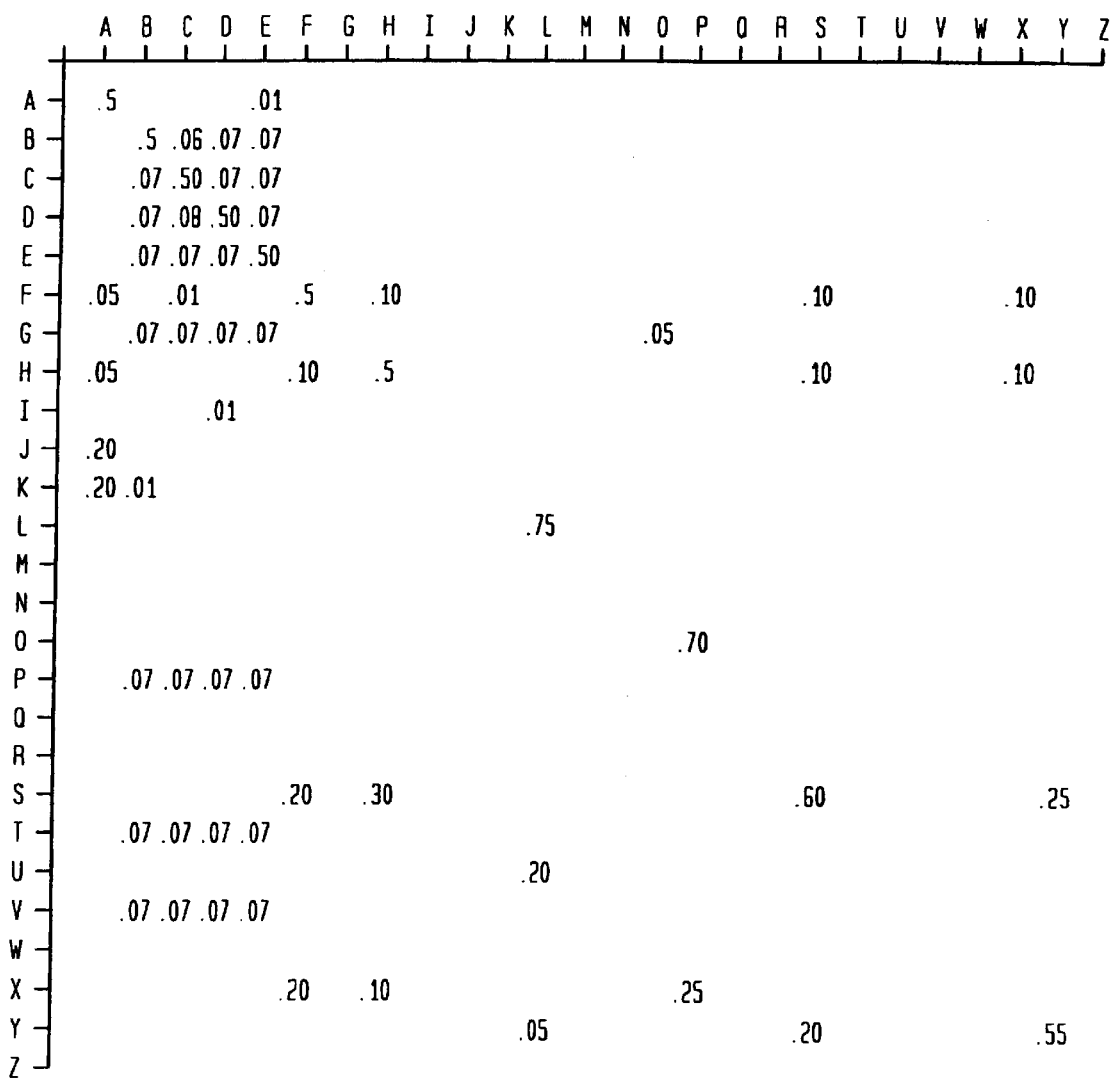
FIG. 2 illustrates an example of a confusion matrix maintained in the confusion matrix memory of the apparatus of FIGS. 1 and 4.

Before explaining in more detail how the system 100 selects a match for an input identifier, the present discussion shall explain the contents of confusion matrix memory 70. Confusion matrix memory 70 stores a plurality of recognition probabilities arranged in matrix form. An example of a confusion matrix is illustrated in FIG. 2. In the example of FIG. 2, each recognition probability is provided in the form of a decimal value. Each recognition probability represents the probability that a particular letter spoken by a user into voice input/output device 10 will be recognized by recognizer 30 either as the same letter or as another letter. For example, the confusion matrix is intended to provide a probability that, when "A" is spoken into device 10, the recognizer 30 will yield an "A", or a "B", a "C", etc., for that particular spoken letter. Although in practice the confusion matrix stored in memory 70 would cover the entire alphabet, for the sake of simplicity and ease of understanding, the confusion matrix of FIG. 2 provides entries for only a portion of the alphabet. Other possible confusion matrices may cover, in addition to letters, numbers, and other characters as well. Moreover, in the example of FIG. 2, where no entry is provided, the blank entry should be read as a zero. In practice, however, the entire matrix may be populated with recognition probabilities.

The confusion matrix of FIG. 2 is read as follows: the vertical columns correspond to characters that are produced by recognizer 30. The horizontal rows correspond to characters of words that are spoken by a user into voice input/output device 10. Of course, the confusion matrix of FIG. 2 may be configured in reverse, in which the horizontal rows correspond to characters produced by recognizer 30, and in which the vertical columns correspond to characters that are spoken by the user. The values that are provided in the confusion matrix represent different probabilities. For example, based on the confusion matrix of FIG. 2, given that the letter "A" is produced by recognizer 30, the probability that "A" was spoken by the user is 50%. The column for the letter "A" also reveals that speaking an "A" will produce a probability of 5% that recognizer 30 will yield an "F" in response, a probability of 5% that the recognizer 30 will yield an "H", a probability of 20% that recognizer 30 will yield a "J", and a probability of 20% that recognizer 30 will yield a "K". Letters that are pronounced similarly are more likely to be confused with each other, and the values that populate the confusion matrix of FIG. 2 reflect that observation. That is why, since "A" and "J" sound alike when pronounced, the recognition probability that a spoken "A" will be misrecognized by recognizer 30 as "J" (20%) is higher than the recognition probability that a spoken "A" will be misrecognized by recognizer 30 as an "F" (5%).

The particular probabilities that are provided in FIG. 2 are determined in advance through experimentation, and they are tailored to suit the particular recognizer 30. Thus, before a particular recognizer is to be used in the system of FIG. 1, a confusion matrix corresponding to that particular recognizer must first be populated. Thus, when a particular recognizer is to be used in the system of FIG. 1, a test group of persons repetitively provides pronunciations of each of the letters and numerals to be included in the confusion matrix, and the recognized output of recognizer 30 for each pronunciation is recorded. In order that the results of these tests incorporate the influence of the noise and bandwidth limitations that affect speech recognizers operating under real conditions, the vocal pronunciations of this test group of persons may be provided to the speech recognizer 30 over a telephone line. From these various "trial runs" of speech recognizer 30, the probabilities that characterize the recognition accuracy of the speech recognizer 30 are established, and these probabilities can be entered as a confusion matrix into memory 70 through data input device 50. Since different recognizers exhibit different recognition accuracies, if speech recognizer 30 is to be replaced with a different recognizer, a confusion matrix corresponding to the replacement recognizer may be entered into memory 70. Or, alternatively, memory 70 may store in advance a plurality of predetermined confusion matrices corresponding to different recognizers, so that when a replacement recognizer is implemented, the corresponding confusion matrix may be accessed by entering a command through input device 50. It should be noted that the probabilities of a confusion matrix need not be arranged in matrix form, but may be arranged as an array, or as any other data structure capable of associating a recognized and spoken character in terms of a probability.

Figure 3:
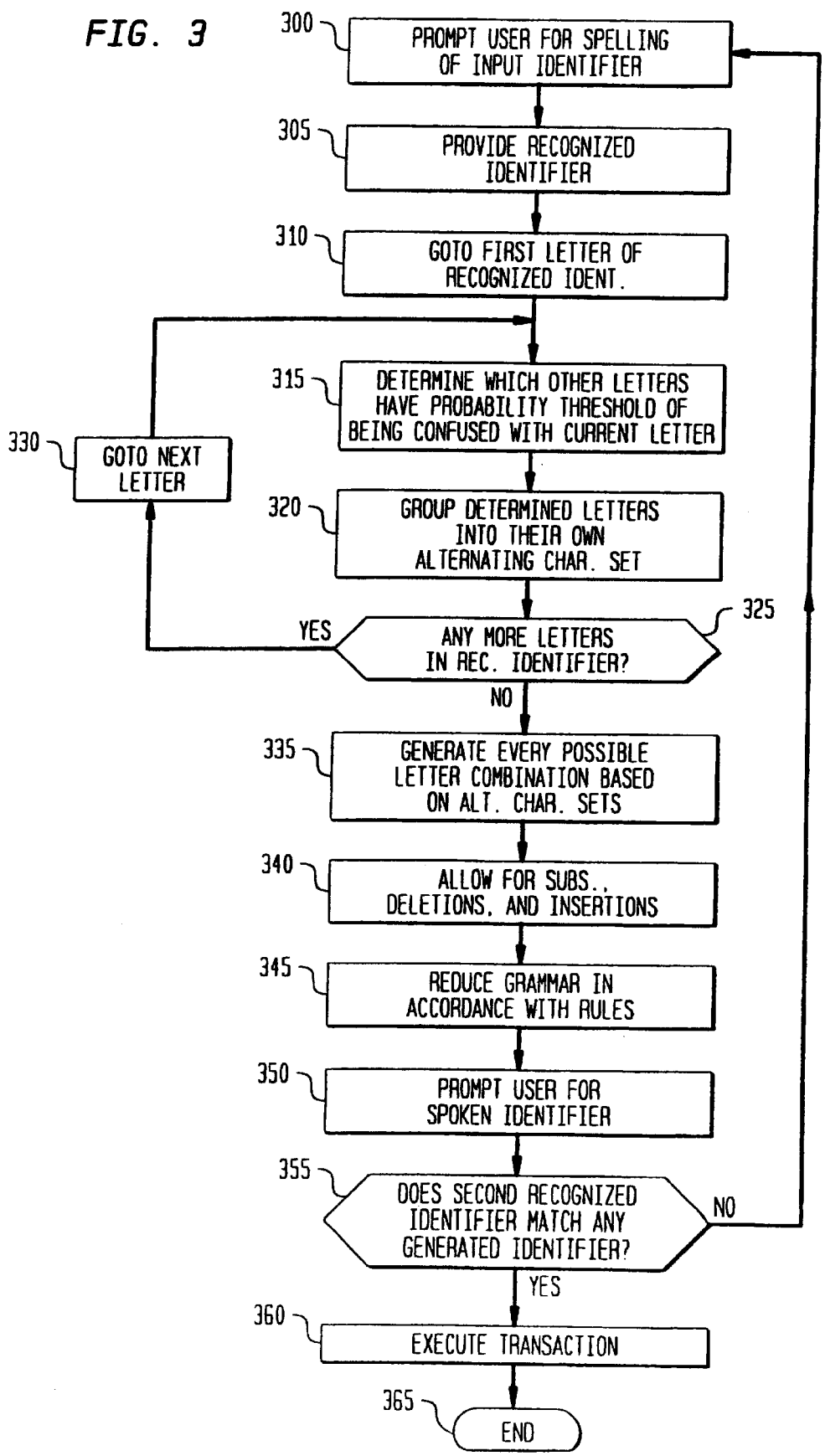
FIG. 3 illustrates a flow diagram in accordance with the first embodiment of the present invention.

In order to provide an understanding of the operation of the system of FIG. 1, reference should now be made to the flow diagram of FIG. 3. The flow diagram of FIG. 3 presents an algorithm, maintained in grammar generating module 45, under which CPU 40 operates in order to generate a grammar based on a recognized identifier and match the recognized identifier to one of the identifiers of the generated grammar. The algorithm of FIG. 3 begins when a user is prompted by voice prompt device 25 to spell an identifier into voice input/output device 10 (step 300). As stated above, for purposes of illustration only, the input identifier shall be assumed to comprise a name, although the present invention is compatible with any other combination of characters. Assume that the user spells the name G-O-L-D. Instead of spelling the name vocally, however, the user may enter the name through a touch-tone keypad. In this type of system, a user would enter the characters of the input identifier by manipulating an appropriate set of keys on a telephone handset. Speech recognizer 30 would not be replaced in this particular modification to system 100 because it would still be required in subsequent operations to be described later. Instead, in order to recognize the touch-tone signals provided by the user, the speech recognizer 30 would be supplemented by a device, which is not shown but which is commonly available in current touch-tone recognition systems, that would produce a recognized identifier based on the entered touch-tone signals.

Assuming for this discussion, however, that a user is required to vocally spell the input identifier at step 300, after the input voice signal corresponding to the input identifier is digitized by A/D converter 20, the digitized signal is provided to speech recognizer 30, which provides a recognized output intended to correspond to the input identifier (step 305). Assume that instead of correctly recognizing the name GOLD, the speech recognizer 30 produces the character combination of EOLE as the recognized identifier. At this point, CPU 40 goes to the first letter of the recognized identifier, "E" (step 310), and determines from the confusion matrix which letters have at least a certain probability of having been spoken as an input letter for the current character position, given that "E" was recognized (step 315). In order to accomplish this determination, CPU 40 goes to the column in the confusion matrix for the letter "E" and determines which of the entries in that column exceed a predetermined threshold. The predetermined threshold is determined on an empirical basis according to any suitable manner, and it reflects the particular characteristics of the speech recognizer 30 and the desired accuracy of the system 100. In this example, assume that the predetermined threshold is 0.06. Based on the confusion matrix of FIG. 2, CPU determines that the letters "B," "C," "D," "G," "P," "T," and "V" all have a confusion matrix recognition probability greater than or equal than 6% of being misrecognized as the letter "E." CPU 40 then groups these letters, together with the letter "E", into one set, referred to as an "alternative character set" (step 320). Since the letter "E" on which this set is based is found in the first character position of the recognized identifier, this alternative character set is associated with the first character position of the recognized identifier.

Next, CPU 40 determines whether any more letters of the recognized identifier remain to be processed in the manner discussed above (step 325). If any more letters remain, CPU 40 goes to the next letter of the recognized identifier (step 330) and performs the same steps 315 and 320 for this next letter. That is, CPU 40 determines, on the basis of the confusion matrix, which letters have a probability of having been spoken that is greater than the predetermined threshold, given that the current letter was recognized. The letters determined in this step are grouped within a new alternative character set that is associated with the character position of the current letter of the recognized identifier.

After CPU 40 determines an alternative character set for each character position of the recognized identifier, CPU 40 generates every possible letter combination that can be derived from the characters of these alternative character sets (step 335). Each of these generated letter combinations is referred to as a "comparison identifier." A limit in generating these identifiers is that the only characters that can occupy a given character position of these comparison identifiers are the characters belonging to the alternative character set that is associated with the given character position. For example, with respect to the recognized identifier EOLE, which was based on the spoken input identifier GOLD, assume that the following alternative character sets were determined in the manner discussed above:
First Character Position (E): B C D E G P T V Z
Second Character Position (O): O W
Third Character Position (L): L U
Fourth Character Position (E): B C D E G P T V Z
Thus, when CPU 40 generates every possible identifier from these alternative character sets, the first character position of each of the comparison identifiers can be occupied only by a letter belonging to the set "B", "C", "D", "E", "G", "P", "T", "V", and "Z". Similarly, the second character position of each comparison identifier will be occupied only by either the letters "O" or "W"; the third character position of each comparison identifier will be occupied only by either the letters "L" or "U"; and the fourth character position of each of the comparison identifiers will be occupied only by a letter belonging to the set "B", "C", "D", "E", "G", "P", "T", "V", and "Z". For this example, the comparison identifiers comprise the following character combinations:
BOLB COLB DOLB EOLB GOLB POLB TOLB VOLB ZOLB BWLB CWLB DWLB
EWLB GWLB PWLB TWLB VWLB ZWLB BOUB COUB DOUB EOUB GOUB POUB
TOUB VOUB ZOUB BWUB CWUB DWUB EWUB GWUB PWUB TWUB VWUB
ZWUB BOLC COLC DOLC EOLC GOLC POLC TOLC VOLC ZOLC BWLC CWLC
DWLC EWLC GWLC PWLC TWLC VWLC ZWLC BOUC COUC DOUC EOUC GOUC
POUC TOUC VOUC ZOUC BWUC CWUC DWUC EWUC GWUC PWUC TWUC VWUC
ZWUC BOLD COLD DOLD EOLD GOLD POLD TOLD VOLD ZOLD BWLD CWLD
DWLD EWLD GWLD PWLD TWLD VWLD ZWLD BOUD COUD DOUD EOUD GOUD
POUD TOUD VOUD ZOUD BWUD CWUD DWUD EWUD GWUD PWUD TWUD
VWUD ZWUD BOLE COLE DOLE EOLE GOLE POLE TOLE VOLE ZOLE BWLE
CWLE DWLE FWLE GWLE PWLE TWLE VWLE ZWLE BOUE DOUE DOUE FOUE
GOUE POUE TOUE VOUE ZOUE BWUE CWUE DWUE EWUE GWUE PWUE TWUE
VWUE ZWUE BOLG COLG DOLG EOLG GOLG POLG TOLG VOLG ZOLG BWLG
CWLG DWLG EWLG GWLG PWLG TWLG VWLG ZWLG BOUG COUG DOUG EOUG
GOUG POUG TOUG VOUG ZOUG BWUG CWUG DWUG EWUG GWUG PWUG
TWUG VWUG ZWUG BOLP COLP DOLP EOLP GOLP POLP TOLP VOLP ZOLP
BWLP CWLP DWLP EWLP GWLP PWLP TWLP VWLP ZWLP BOUP COUP DOUP
EOUP GOUP POUP TOUP VOUP ZOUP BWUP CWUP DWUP EWUP GWUP PWUP
TWUP VWUP ZWUP BOLT COLT DOLT EOLT GOLT POLT TOLT VOLT ZOLT
BWLT CWLT DWLT EWLT GWLT PWLT TWLT VWLT ZWLT BOUT COUT DOUT
EOUT GOUT POUT TOUT VOUT ZOUT BWUT CWUT DWUT EWUT GWUT PWUT
TWUT VWUT ZWUT BOLV COLV DOLV EOLV GOLV POLV TOLV VOLV ZOLV
BWLV CWLV DWLV EWLV GWLV PWLV TWLV VWLV ZWLV GOUV COUV DOUV
EOUV GOUV POUV TOUV VOUV ZOUV BWUV CWUV DWUV EWUV GWUV
PWUV TWUV VWUV ZWUV BOLZ COLZ DOLZ EOLZ COLZ POLZ TOLZ VOLZ
ZOLZ BWLZ CWLZ DWLZ EWLZ GWLZ PWLZ TWLZ VWL ZWLZ BOUZ COUZ
DOUZ EOUZ GOUZ POUZ TOUZ VOUZ ZOUZ BWUZ CWUZ DWUZ EQUZ GWUZ
PWUZ TWUZ VWUZ ZWUZ
Of course, had the speech recognizer 30 produced a recognized identifier other than EOLE, CPU 40 would have produced a different alternative character set distribution, and, consequently, the comparison identifiers would have been different from the ones appearing above. CPU 40 then stores these comparison identifiers in database 35.

What is also revealed by this exemplary list of comparison identifiers is that each of the comparison identifiers will be of the same character length as the recognized identifier. In this example, the recognized identifier and the comparison identifiers are each four characters long. Nevertheless, the character length of the recognized identifier, which determines the character length of the comparison identifiers, need not always correspond to the character length of the input identifier spoken by the user. In this case they do correspond, since GOLD and EOLE have the same character length, but that may not always be the case. Therefore, not only can speech recognizer 30 misrecognize an input identifier by erroneously recognizing an input character as another character, but speech recognizer 30 may also produce an erroneous recognized identifier by adding or deleting characters, which results in a recognized identifier that has a character length that is different than the character length of the input identifier. Since the comparison identifiers will have the same character length as the recognized identifier, if the respective character lengths of the input and recognized identifiers are different, then each of the comparison identifiers will not be of the same character length as the input identifier. As a consequence, none of the comparison identifiers, as initially generated, will match the input identifier in this situation.

Word change table 65 addresses this problem. Included within word change table 65 are a set of rules for adding more identifiers to the comparison identifiers initially produced in step 335. The comparison identifiers added in accordance with the instructions of word change table 65 are based on the comparison identifiers generated in step 335. The rules of table 65 allow for characters to be deleted from, substituted for, or added to the characters of the previously generated comparison identifiers (step 340). Some of the rules may, for example, allow for two substitutions if the initially generated comparison identifiers each comprise four characters, or allow for one substitution if the initially generated comparison identifiers each comprise three characters. Other rules in table 65 may add or delete any character from any character position of a previously generated comparison identifier. For example, based on the identifier EOLD generated in step 335, CPU 40, operating in step 340 in accordance with the rules of table 65, may generate such additional identifiers as EOL or EOLDE. These operations discussed above with respect to step 340 may be performed in accordance with any suitable character manipulation algorithm.

After adding the identifiers generated in step 340 to the identifiers generated in step 335 in database 35, CPU 40 modifies this collection of comparison identifiers again, but this time in accordance with the rules provided to spelling rule table 60 (step 345). Since a substantial portion of the comparison identifiers are mere aggregations of characters resembling no known words, the rules of table 60 eliminate such character aggregations that fall within their ambit. For example, one rule in table 60 may require the elimination from database 35 of any comparison identifier comprising three consecutive consonants, since the vast majority of words in the English language does not include such consonant strings. Other rules may require the elimination of those identifiers that do not follow the letter Q with a U, unless, of course, Q is the last letter in the identifier. Depending on the extent of the rules in table 60, most, if not all, of the comparison identifiers left in database 35 will comprise actual words or names.

After modifying the initial group of comparison identifiers in accordance with steps 335 and 340, CPU 40 causes voice prompt device 25 to prompt the user for the input identifier again (step 350), but this time the user is prompted to pronounce, not spell, the input identifier. Conventional speech recognizers, such as the HARK 3.0 speech recognizer, are capable of providing a recognized identifier when a user spells an input identifier. Furthermore, the recognizer would also be capable of producing a recognized identifier on the basis of an input identifier that the user pronounced. The ability to provide recognized identifiers on the basis of spelled and pronounced input identifiers is commonly available in such speech recognizers as the above-mentioned HARK™ 3.0 recognizer. As a result, a second recognized identifier is produced. Of course, instead of reprompting the user for the input identifier, the system 100 may instead continue relying on the original recognized identifier. Assuming, however, that the system 100 produces a second recognized identifier in accordance with step 350, CPU 40 attempts to match the second recognized identifier with one of the comparison identifiers (step 355). If a match is found, then the matched comparison identifier is selected as corresponding to the input identifier and a transaction is executed on the basis of the matched comparison identifier (step 360). For example, the matched identifier may be used to access associated account information. Before executing a transaction based on the reference identifier selected by CPU 40 to match the input identifier, the system 100 may be programmed to require the user to be prompted with the selected comparison identifier for confirmation. After the system 100 executes a particular transaction, system 100 may clear database 35 for the next user. If no match is found in step 355, or if the user rejects the comparison identifier that is presented as a match, CPU 40 may return to step 300 and require the user to spell the input identifier again. Alternatively, if no match is found, the user may be transferred to a live operator, who would attempt to assist the user in executing a desired transaction.

Figure 4:
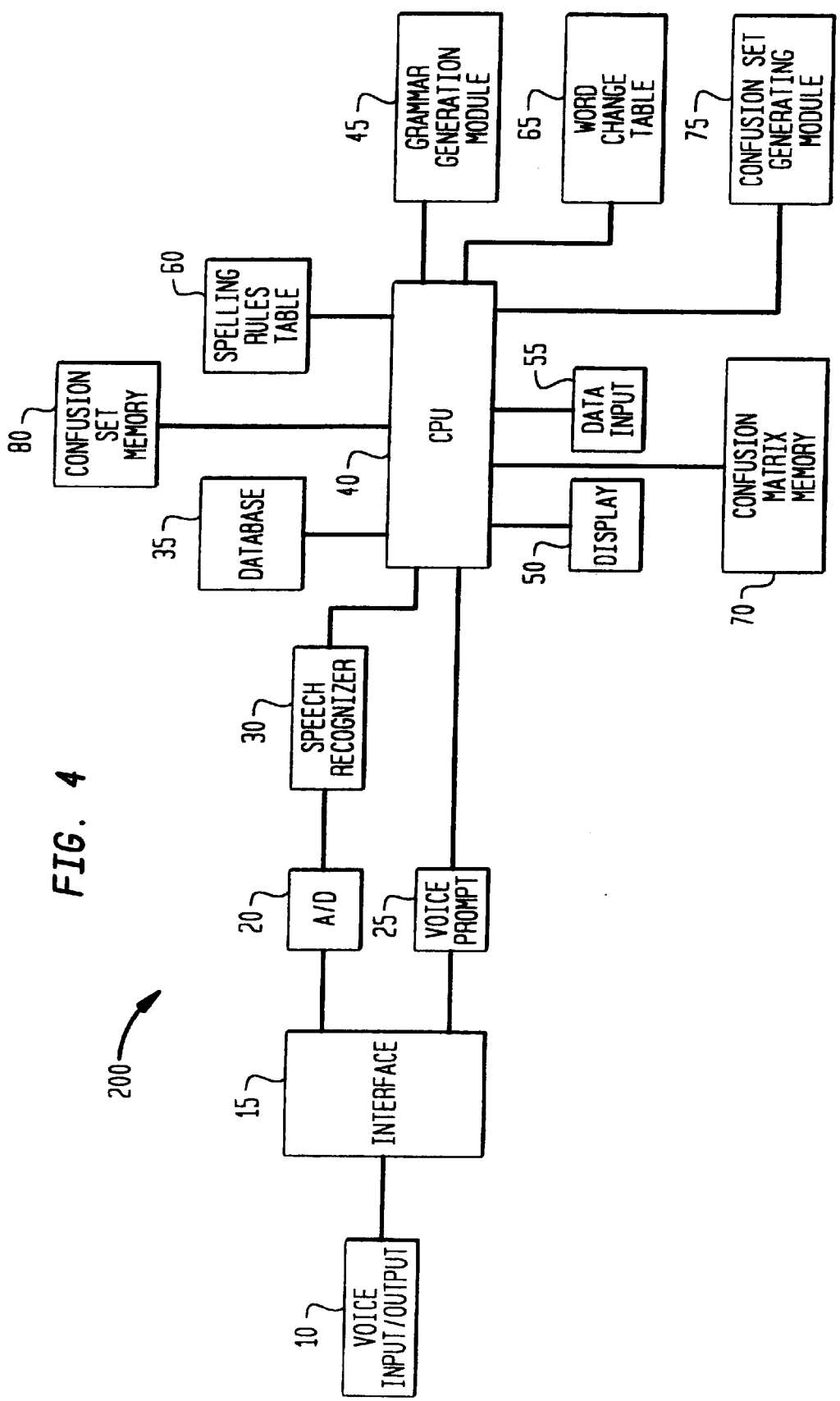
FIG. 4 illustrates a block diagram of an apparatus in accordance with a second embodiment of the present invention.

FIG. 4 illustrates an alternative embodiment of system 100. The system 200 of FIG. 4 includes the same components as FIG. 1 and also confusion set generation module 75 and confusion set memory 80. The main difference between the system 100 of FIG. 1 and the system 200 of FIG. 2 is that the system of FIG. 4 uses a pre-stored collection of confusion sets to produce the comparison identifiers described above. By way of definition, a confusion set is a collection of characters that have a certain likelihood of being confused with one another. Confusion sets are thus merely a systematized manifestation of the common-sense notion that certain groups of letters are more likely than others to be confused because certain of these letters sound quite alike. The confusion sets are maintained in confusion set memory 80, and CPU 40 generates the confusion sets in accordance with the algorithm maintained in confusion set generating module 75. The process of generating the confusion sets involves manipulating the entries of the confusion matrix in order to group together in sets characters having a relatively high probability of being confused with the other characters in the same set. In order to understand the manner in which the present invention generates confusion sets, assume that the following confusion sets are generated:

CONFUSION SET 1: A J K
CONFUSION SET 2: B C D E G P T V Z
CONFUSION SET 3: F H S X
CONFUSION SET 4: I Y
CONFUSION SET 5: L U Q
CONFUSION SET 6: M N
CONFUSION SET 7: O W
CONFUSION SET 8: R

As explained above, each confusion set is intended to group together those letters that are most likely to be confused with each other. Within the context of a speech recognition system, the letters that are most often confused with each other are the letters that are pronounced the most similarly. The manner in which these confusion sets are generated is such that characters from different confusion sets have a relatively low probability of being confused with each other. The determination of which letters should be grouped together is based on the recognition probabilities arranged in the confusion matrix of memory 70. In the above example of confusion sets, confusion set 1 groups together the letters "A", "B", and "C". Confusion set 2 groups together the letters "B", "C", "D", "E", "P", "T", and "V".

Confusion set 3 comprises the letters "S", "F", and "X". Confusion set 4 comprises the letters "I", "R", "O", and "L". Confusion set 5 comprises the letters "M" and "N". Confusion set 6 comprises the letter "W", and confusion set 7 comprises the letter "H".

Figure 6:
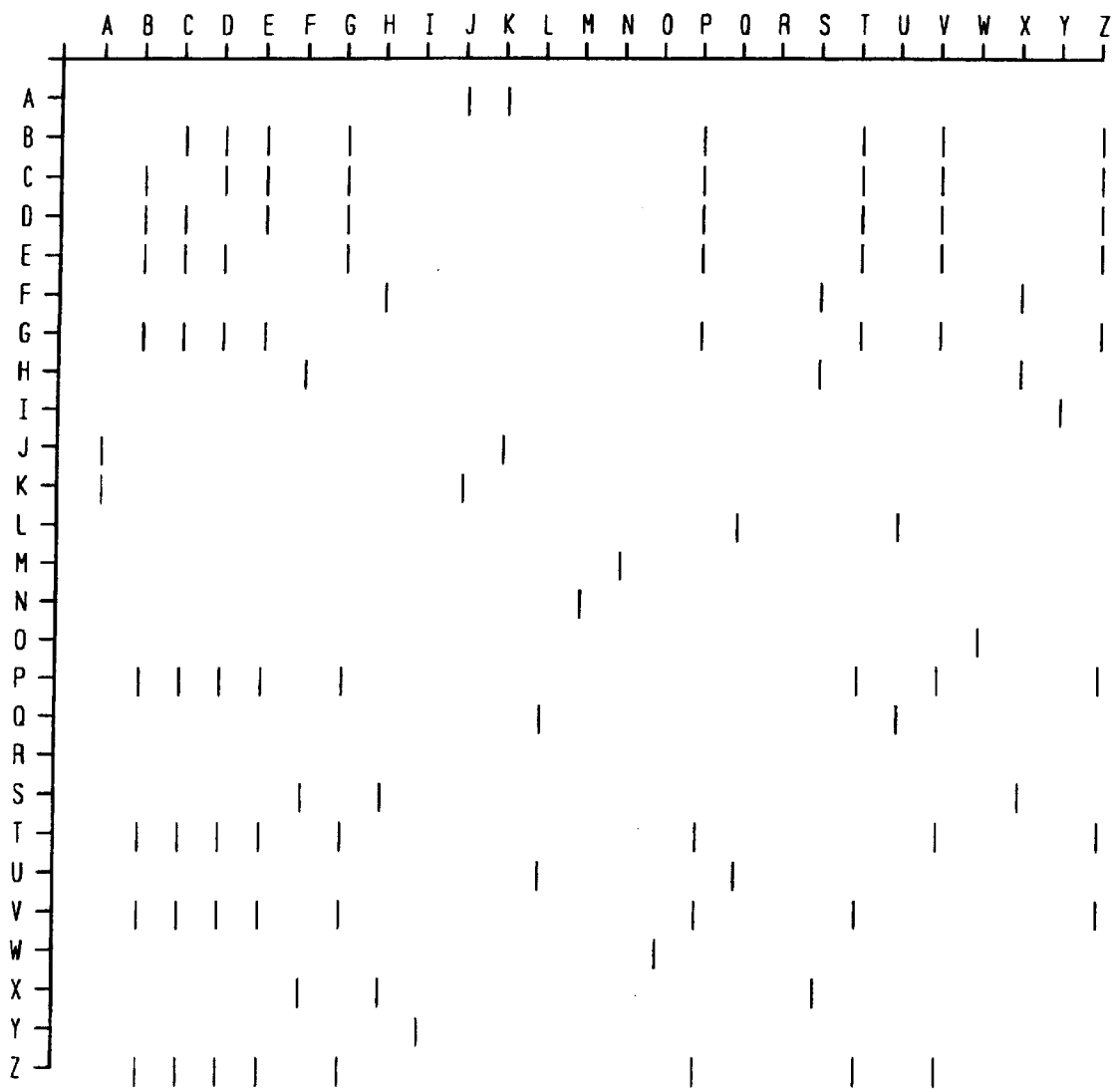
FIG. 6 illustrates a connectivity matrix used to generate the confusion sets that are used according to the second embodiment of the present invention.

Operating in accordance with the instructions provided by confusion set generating module 75 and in accordance with the confusion matrix provided in memory 70, CPU 40 performs the necessary calculations and procedures for generating the confusion sets, and once generated, these confusion sets are maintained in memory 80. The first step in generating the confusion sets involves generating a matrix based on the confusion matrix that corresponds to the speech recognizer 30 currently in use. In particular, each entry location (i.e., the intersection point of row X with column Y) of the newly generated matrix is populated with a value of 1 if the same entry location in the confusion matrix is populated with a recognition probability that is greater than a predetermined threshold. For those entry locations of the confusion matrix having recognition probabilities that are less than or equal to the threshold, the corresponding entry locations of the newly generated matrix receive a value of 0. The threshold is determined empirically according to any suitable method, and it reflects the recognition characteristics of the speech recognizer associated with the confusion matrix. The newly generated matrix that results from this procedure is a matrix that comprises only ones and zeroes. This matrix is then multiplied by itself a number of times equal to the amount of characters represented by the confusion matrix. Thus, if the confusion matrix covers the entire alphabet, which includes twenty-six letters, then the ones-and-zeroes matrix is multiplied by itself twenty-six times. The product of this multiplication is referred to as a connectivity matrix, an example of which is illustrated in FIG. 6.

The distribution of characters among the various confusion sets depends on the distribution of ones in the connectivity matrix. Everywhere in the connectivity matrix that there is a one, the letters of the associated row and column are included in the same confusion set. For example, in FIG. 6, the column corresponding to the letter "A" includes a one at the rows corresponding to the letters "J" and "K". Thus, the letters "A", "J", and "K" are placed within one confusion set. For column "B", ones are associated with rows "C", "D", "E", "G", "P", "T", "V", and "Z". Thus, the letters "B", "C", "D", "E", "G", "P", "T", "V", and "Z" are included in another confusion set. This process is repeated until each character represented in the original confusion matrix is associated with a confusion set. The confusion sets mentioned above represent one possible arrangement that the above-discussed process may yield.

It should be appreciated that this confusion set generation need not be performed after the system is put in practice, but instead may be accomplished before the system 200 begins interacting with users. Moreover, every time a new recognizer is installed, and consequently, a new associated confusion matrix is activated, the system 200 requires a corresponding new plurality of confusion sets to be generated. Of course, each different plurality of confusion sets may be generated beforehand, so that if a new speech recognizer is implemented, the appropriate plurality of confusion sets may be activated by entering a command through data input device 50. Further, the above-discussed procedure is not the only way to generate a plurality of confusion sets; the present invention is intended to encompass any suitable process for grouping the most often confused letters with one another. Thus, for example, had the system 200 been programmed to store recognition probabilities according to a data structure other than a confusion matrix, the present invention would encompass whatever technique is suitable for that data structure for determining which groups of letters are most often confused with one another.

Figure 5:
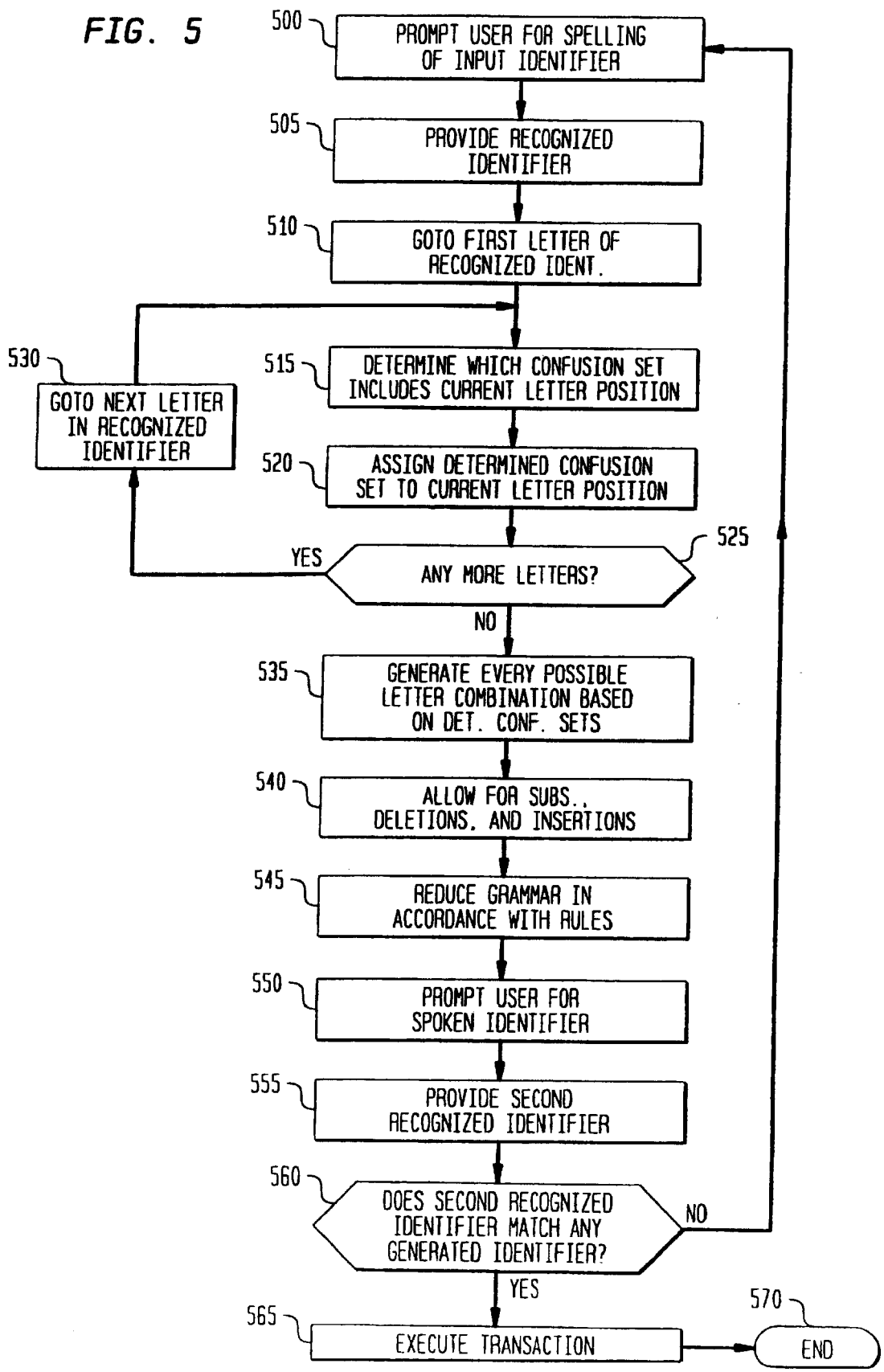
FIG. 5 illustrates a flow diagram in accordance with the second embodiment of the present invention.

In order to provide an understanding of the operation of the system of FIG. 4, reference should now be made to the flow diagram of FIG. 5. The flow diagram of FIG. 5 presents an algorithm, maintained in grammar generating module 45, under which CPU 40 operates in order to generate a grammar based on a recognized identifier and match the recognized identifier to one of the identifiers of the generated grammar. As explained above, what is different about the algorithm of FIG. 5, as compared with that of FIG. 3, is that the FIG. 5 algorithm generates the comparison identifiers on the basis of predetermined confusion sets, while the algorithm of FIG. 3 relies directly on a confusion matrix to dynamically arrange in each instance of use the alternative character sets discussed above. Both the algorithms of FIG. 3 and of FIG. 5 may be maintained as alternative procedures in grammar generation module 45.

The algorithm of FIG. 5 begins when a user is prompted by voice prompt device 25 to spell an identifier into voice input/output device 10 (step 500). As with the discussion of FIG. 3, the input identifier shall be assumed to comprise a name, although the present invention is compatible with any other combination of characters. Assume that the user spells the name G-O-L-D. After the input voice signal corresponding to the input identifier is digitized by A/D converter 20, the digitized signal is provided to speech recognizer 30, which provides a recognized output intended to correspond to the input identifier (step 505). Assume that instead of correctly recognizing the name GOLD, the speech recognizer 30 produces the character combination of EOQP as the recognized identifier. At this point, CPU 40 goes to the first letter of the recognized identifier, "E" (step 510), and determines from the pre-stored contents of memory 80 which confusion set includes the letter E (step 515). The confusion set determined in step 515 is then assigned to the character position of the current letter under analysis, which in this case is the first character position (step 520). For example, since the letter E belongs to CONFUSION SET 1, CPU 40 associates the first character position of the recognized identifier with CONFUSION SET 1. CPU 40 then checks to see if any more letters of the recognized identifier need to be analyzed (step 525). If more letters remain, then CPU 40 repeats steps 515 and 520 for the remaining letters of the recognized identifier, so that each character position of the recognized identifier is associated with one of the confusion sets.

In step 535, CPU 40 generates every possible combination of characters from the confusion sets assigned in step 520. As with the previously discussed system 100 of FIG. 1, these generated character combinations are referred to as comparison identifiers. This operation is performed in the same manner as step 335 of FIG. 3, meaning that the only characters that can occupy a given character position of these comparison identifiers are the characters belonging to the confusion set that is associated with the given character position. The set of comparison identifiers are modified to allow for variable length identifiers and to eliminate non-words (steps 540 and 545); this operation is performed in the same manner as steps 340 and 345 of FIG. 3 under the control of the instructions included in word change table 65 and spelling rules table 60, respectively. After storing the comparison identifiers in database 35, the CPU 40 then causes voice prompt device 25 to prompt the user for the input identifier again (step 550). As with FIG. 3, the system 200 need not re-prompt the user for the input identifier, but instead may use the recognized identifier provided during the execution of step 505. Assuming that the user is re-prompted for the input identifier, this second prompt requires the user to pronounce, not spell, the input identifier. After producing a second recognized identifier based on this pronunciation (step 555), CPU 40 determines whether the second recognized identifier matches any of the comparison identifiers of database 35 (step 560). If such a match exists, then the matched comparison identifier is selected as corresponding to the input identifier, and a transaction is performed based on this matched comparison identifier (step 565). Before executing a transaction based on the reference identifier selected by CPU 40 to match the input identifier, the system 200 may be programmed to require the user to be prompted with the selected comparison identifier for confirmation. After the system 200 executes a particular transaction, system 100 may clear database 35 for the next user. If no match is found in step 355, or if the user rejects the comparison identifier that is presented as a match, CPU 40 may return to step 300 and require the user to spell the input identifier again. Alternatively, if no match is found, the user may be transferred to a live operator, who would attempt to assist the user in executing a desired transaction.

Although the present invention has been presented within the context of a speech recognition system that matches an input identifier with one of a plurality of identifiers generated on the basis of a confusion matrix or a collection of confusion sets, it should be appreciated that the present invention is not limited thereto, but instead, is applicable to a wide variety of applications that recognize input identifiers of any particular format by generating various letter combinations (i.e., comparison identifiers) from the input identifier itself. Thus, the confusion matrix and confusion sets discussed above are but two of the possible implementations that are capable of generating the required letter combinations. Other techniques for generating such letter combinations include, but are not limited to, using commonly available speech recognizers that produce not just a single recognized identifier in response to an input identifier, but instead generate the N-best identifiers for matching the input identifier. In this alternative, the comparison identifiers would correspond to the N-best identifiers, which would be generated when the input identifier is provided in accordance with a first form. The system would then prompt the user to provide the same identifier in a different form. The recognized identifier provided according to this second form would correspond to the first of the N-best identifiers generated in this second iteration. This recognized identifier provided according to the second form would be compared to the comparison identifiers in the same manner discussed above to determine a match. By using the embodiments discussed herein, input identifier recognition systems not only shorten the time for finding a match, but they also find such matches more accurately without needing to use a vast database of pre-stored reference identifiers.

What is claimed is:

1. A method of recognizing an input identifier, comprising the steps of:

a) performing a first prompting operation to prompt a user at a first time in a recognition operation to provide the input identifier according to a first form;

b) providing a first recognized identifier on the basis of the input identifier; the input identifier being provided by a user, c) generating a plurality of comparison identifiers having a content derived from the first recognized identifier;

d) performing a second prompting operation to prompt the user at a second time in the recognition operation subsequent to the first time to provide the input identifier according to a second form, wherein the first form and the second form are different;

e) providing a second recognized identifier on the basis of the input identifier provided in step d);

f) determining which, if any, of the plurality of comparison identifiers matches the second recognized identifier; and g) selecting the comparison identifier determined in step f) as corresponding to the input identifier.

2. The method according to claim 1, wherein the step a) comprises:

i) prompting the user to spell the input identifier.

3. The method according to claim 2, wherein the step d) comprises:

ii) prompting the user to pronounce the input identifier.

4. The method according to claim 3, wherein the input identifier comprises a name.

5. The method according to claim 1, wherein the step c) comprises:

i) determining, for each character position of the first recognized identifier, an alternative character set, each character of each alternative character set being associated with at least a predetermined probability of having been provided by the user in step a); and ii) generating the plurality of comparison identifiers on the basis of at least each of the alternative character sets determined in step i).

6. The method according to claim 5, wherein each alternative character set determined in step i) is determined on the basis of a confusion matrix.

7. The method according to claim 5, further comprising:

iii) generating further comparison identifiers to be added to the plurality of comparison identifiers by performing at least one of a character addition operation, a character deletion operation, and a character substitution operation on at least a portion of the plurality of comparison identifiers generated in step ii); and iv) eliminating from the plurality of comparison identifiers those comparison identifiers comprising non-words.

8. The method according to claim 1, wherein the step c) comprises:

i) providing a plurality of confusion sets, each confusion set including a different aggregation of characters;

ii) determining, for each character of the first recognized identifier, which confusion set includes which character of the first recognized identifier; and iii) generating the plurality of comparison identifiers on the basis of at least each of the confusion sets determined in step ii).

9. The method according to claim 8, further comprising:

iv) generating further comparison identifiers to be added to the plurality of comparison identifiers by performing at least one of a character addition operation, a character deletion operation, and a character substitution operation on at least a portion of the plurality of comparison identifiers generated in step iii); and v) eliminating from the plurality of comparison identifiers those comparison identifiers comprising non-words.

10. The method according to claim 1, wherein the content of the plurality of comparison identifiers is indeterminate prior to a performance of the recognition operation.

11. An apparatus for recognizing an input identifier, comprising:

a) first means for performing a first prompting operation to prompt a user at a first time in a recognition operation to provide the input identifier according to a first form;

b) first means for providing a first recognized identifier on the basis of the input identifier; the input identifier being provided by a user, c) first means for generating a plurality of comparison identifiers having a content derived from the first recognized identifier;

d) second means for performing a second prompting operation to prompt the user at a second time in the recognition operation subsequent to the first time to provide the input identifier according to a second form, wherein the second form is different than the first form;

e) second means for providing a second recognized identifier on the basis of the input identifier provided by the second means for prompting;

f) first means for determining which, if any, of the plurality of comparison identifiers matches the second recognized identifier; and g) means for selecting the comparison identifier determined by the means for determining as corresponding to the input identifier.

12. The apparatus according to claim 11, wherein the first means for prompting comprises:

i) means for prompting the user to spell the input identifier.

13. The apparatus according to claim 12, wherein the second means for prompting comprises:

ii) means for prompting the user to pronounce the input identifier.

14. The apparatus according to claim 13, wherein the input identifier comprises a name.

15. The apparatus according to claim 11, wherein the first means for generating comprises:

i) second means for determining, for each character position of the first recognized identifier, an alternative character set, each character of each alternative character set being associated with at least a predetermined probability of having been provided by the user in step a); and ii) second means for generating the plurality of comparison identifiers on the basis of at least each of the alternative character sets determined by the second means for determining.

16. The apparatus according to claim 15, wherein each alternative character set is determined on the basis of a confusion matrix.

17. The apparatus according to claim 15, further comprising:

iii) third generating means for generating further comparison identifiers to be added to the plurality of comparison identifiers by performing at least one of a character addition operation, a character deletion operation, and a character substitution operation on at least a portion of the plurality of comparison identifiers generated by the second generating means; and iv) means for eliminating from the plurality of comparison identifiers those comparison identifiers comprising non-words.

18. The apparatus according to claim 11, wherein the first generating means comprises:

i) third means for providing a plurality of confusion sets, each confusion set including a different aggregation of characters;

ii) second means for determining, for each character of the first recognized identifier, which confusion set includes which character of the first recognized identifier; and iii) second means for generating the plurality of comparison identifiers on the basis of at least each of the confusion sets determined by the second determining means.

19. The apparatus according to claim 18, further comprising:

iv) third means for generating further comparison identifiers to be added to the plurality of comparison identifiers by performing at least one of a character addition operation, a character deletion operation, and a character substitution operation on at least a portion of the plurality of comparison identifiers generated by the second means for generating; and v) means for eliminating from the plurality of comparison identifiers those comparison identifiers comprising non-words.

20. An apparatus, comprising:

a processing device;

a recognizing device coupled to the processing device, the recognizing device including an input for receiving an input identifier; the input identifier being provided by a user;

a database coupled to the processing device;

a grammar generation module coupled to the processing device; and a confusion matrix memory coupled to the processing device.

21. The apparatus according to claim 20, further comprising:

a spelling rules table coupled to the processing device; and a word change table coupled to the processing device.

22. An apparatus, comprising:

a processing device;

a recognizing device coupled to the processing device, the recognizing device including an input for receiving an input identifier;

a database coupled to the processing device;

a grammar generation module coupled to the processing device; the input identifier being provided by a user;

a confusion matrix memory coupled to the processing device;

a confusion set generation module coupled to the processing device; and a confusion set memory coupled to the processing device.

23. The apparatus according to claim 22, further comprising:

a spelling rules table coupled to the processing device; and a word change table coupled to the processing device.

* * * * *